United States Patent
Reed et al.

[11] Patent Number: 6,087,976
[45] Date of Patent: Jul. 11, 2000

[54] RADAR OBJECT DETECTION SYSTEM HAVING NORMALIZED RANGE SENSITIVITY

[75] Inventors: John Christopher Reed, Tucson, Ariz.; Gerald Brand, Los Angeles, Calif.

[73] Assignee: Delco Electronics Corp., Kokomo, Ind.

[21] Appl. No.: 09/257,841

[22] Filed: Feb. 25, 1999

[51] Int. Cl.[7] .................................................. G01S 13/93
[52] U.S. Cl. ........................ 342/70; 342/27; 342/89; 342/118; 342/175; 342/195
[58] Field of Search ................... 342/23, 27–29, 342/41, 70–72, 89, 90, 94–97, 118, 21, 159, 175, 192–197

[56] References Cited

U.S. PATENT DOCUMENTS

| | | | |
|---|---|---|---|
| 4,150,375 | 4/1979 | Ross et al. | 342/21 |
| 5,657,021 | 8/1997 | Ehsani-Nategh et al. | 342/70 |
| 5,923,280 | 7/1999 | Farmer | 342/70 |

*Primary Examiner*—Bernarr E. Gregory
*Attorney, Agent, or Firm*—Jimmy L. Funke

[57] ABSTRACT

An improved obstacle detection radar system and method of operation in which the detection sensitivity is normalized with respect to target range without significantly increasing system complexity or cost, while at same time improving the system response time. The system consecutively integrates the received radar illumination corresponding to each of several contiguous range bins over different dwell intervals specific to the respective range bins. In particular, the dwell intervals are progressively reduced for the range bins nearest the system antennas, thereby reducing the detection sensitivity in those range bins, and at the same time, reducing the time required to completely scan all of the range bins. As a result, the signal attributable to the side-lobe patterns is inherently attenuated, the sensitivity is more normalized, and system response time is improved. Accordingly, the probability of detection for a given target within the desired detection range is less dependent on its distance from the radar system.

8 Claims, 3 Drawing Sheets

6,087,976

RADAR OBJECT DETECTION SYSTEM HAVING NORMALIZED RANGE SENSITIVITY

TECHNICAL FIELD

This invention relates to radar detection systems of the type in which a detection range is divided into plural contiguous range bins.

BACKGROUND OF THE INVENTION

In radar object detection systems, the desired detection space is usually partitioned into numerous adjacent regions of increasing distance from the system antennas. Each of these regions may be referred to as a "range bin", and the system output indicates the presence of an object or target in a particular range bin. In general, the radar system "illuminates" the detection space with high frequency energy with a transmitter antenna, an object in the detection space scatters a portion of the illumination, and the system observes the scattered illumination with a receiver antenna. Some systems observe the scattered illumination from all of the range bins simultaneously, while other systems observe the scattered illumination from only one range bin at a time.

A generally undesirable characteristic of radar systems of the type described above is that the object detection sensitivity is much greater for range bins that are close to the system antennas than for range bins that are further away. The characteristic arises in part because the illumination (and therefore, the scattered energy) is naturally stronger at close range, and in part because side-lobe patterns of the transmitting antenna increase the effective illumination at short range. The side-lobe illumination patterns also have the effect of increasing the detection angle at short range, which is often undesirable in obstacle detection systems. For these reasons, various techniques have been developed for reducing detection sensitivity of the side-lobes, and effectively normalizing the system sensitivity versus range. In pulse-type radar systems, for example, an electronically controlled device may be incorporated into the receiver to attenuate the received signal as a function of time. This technique is referred to as a "sensitivity time control", and is not applicable to continuous wave radar systems since the returned energy from all of the targets in all of the range bins are present at all times. Another approach is to incorporate a side-lobe canceling circuit in the receiver channel for distinguishing between the main-lobe and side-lobe signals by generating an auxiliary signal that closely matches the side-lobe signal. A further approach is to establish detection thresholds which vary among range bins based on distance from the antennas. Each of these approaches involves the addition of circuitry to the system, and therefore increases the system complexity and cost.

SUMMARY OF THE INVENTION

The present invention is directed to an improved obstacle detection radar system in which the detection sensitivity is normalized with respect to target range without significantly increasing system complexity or cost, while at same time improving the system response time.

According to the invention, the system consecutively integrates the received radar illumination corresponding to each of several contiguous range bins over different dwell intervals specific to the respective range bins. In particular, the dwell intervals are progressively reduced for the range bins nearest the system antennas, thereby reducing the detection sensitivity in those range bins, and at the same time, reducing the time required to completely scan all of the range bins. As a result, the signal attributable to the side-lobe patterns is inherently attenuated, the sensitivity is more normalized, and system response time is improved. Accordingly, the probability of detection for a given target within the desired detection range is less dependent on its distance from the radar system.

DESCRIPTION OF THE PREFERRED EMBODIMENT

Figure 1:
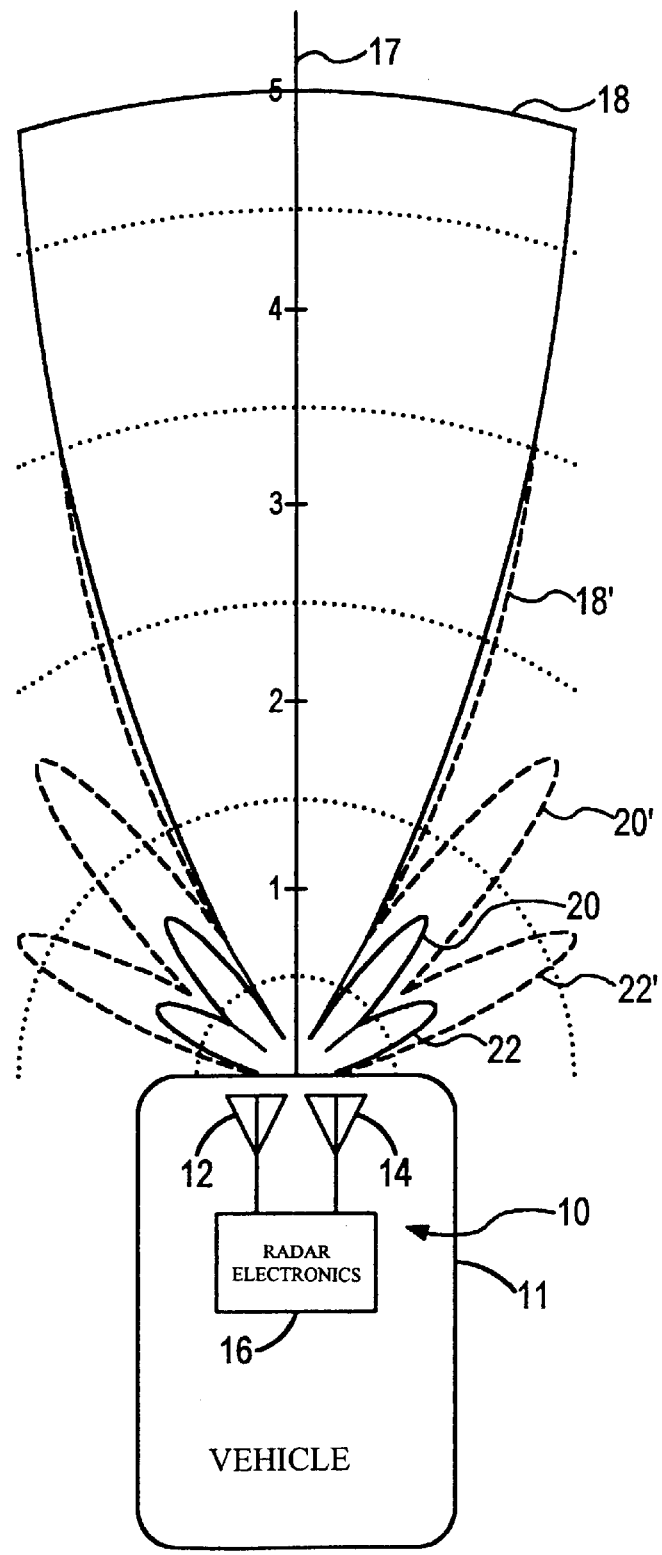
FIG. 1 depicts a motor vehicle having a radar back-up obstacle detection system, and illustrates the attenuation of side-lobe response achieved according to this invention.

Referring to the drawings, and more particularly to FIG. 1, the reference numeral 10 generally designates a radar obstacle detection system installed in a motor vehicle 11 as a back-up aid for the vehicle driver. The system 10 includes a transmitting antenna 12 for illuminating a desired detection region to the rear of vehicle 11, a receiving antenna 14 for detecting radar energy reflected back to the vehicle 11 due to the presence of a radar scattering object (target, obstacle, etc.) in the detection region, and radar electronics 16 for developing and processing the radar signals, and for alerting the driver when an object is detected. In practice, the antennas 12 and 14 are typically co-located in a central position, such as where the axis 17 intersects the rear of the vehicle 11.

The transmitting antenna 12 illuminates or radiates radar energy to the rear of the vehicle 11 where the receiving antenna 14 receives radar energy back-scattered from the objects to be detected. The receive antenna receives energy in a characteristic pattern including a main lobe and one or more side lobes, which in the usual case are laterally symmetrical about the axis 17. In FIG. 1, the characteristic main lobe is represented by the broken trace 18', and the principle characteristic side lobes are represented by the broken traces 20' and 22'. In general, the antenna 14 is designed so that the main lobe 18' coincides as nearly as possible with the desired detection region of the system 10, both in width and length. In FIG. 1, for example, the main lobe 18' has a generally conical shape, and a reliable detection range of approximately five meters from the rear of the vehicle 11. As illustrated, the side lobes 20', 22' increase the intensity of the illumination at close range to the vehicle 11, and widen the actual detection region beyond the desired region, especially at a range of about two meters and less.

The present invention is directed to a system and method which reduces the side lobe response so that the system 10 behaves as though antennas 12 and 14 had a combined illumination and reception pattern substantially as depicted by the solid lines 18, 20 and 22 in FIG. 1. As indicated, the pattern of the main lobe is changed only slightly, whereas the patterns of the side lobes are greatly diminished in amplitude. As a result, the angle of system detection sensitivity is narrowed approximately to that of the desired detection region except at very close range, and the receiver sensitivity at short ranges is significantly reduced so that the detection sensitivity is more nearly normalized over the entire detection range. Importantly, this effect is achieved according to the invention without significantly increasing the system complexity or cost—not through the addition of filter or compensation circuitry, but by scheduling the integration dwell time of the radar electronics 16 as a function of the range of the detection region (range bin) being scanned. Since the dwell time for some of the detection regions is reduced compared to a conventional system, the overall system response time is reduced, allowing the system to more quickly detect objects entering the desired detection region.

Figure 2:
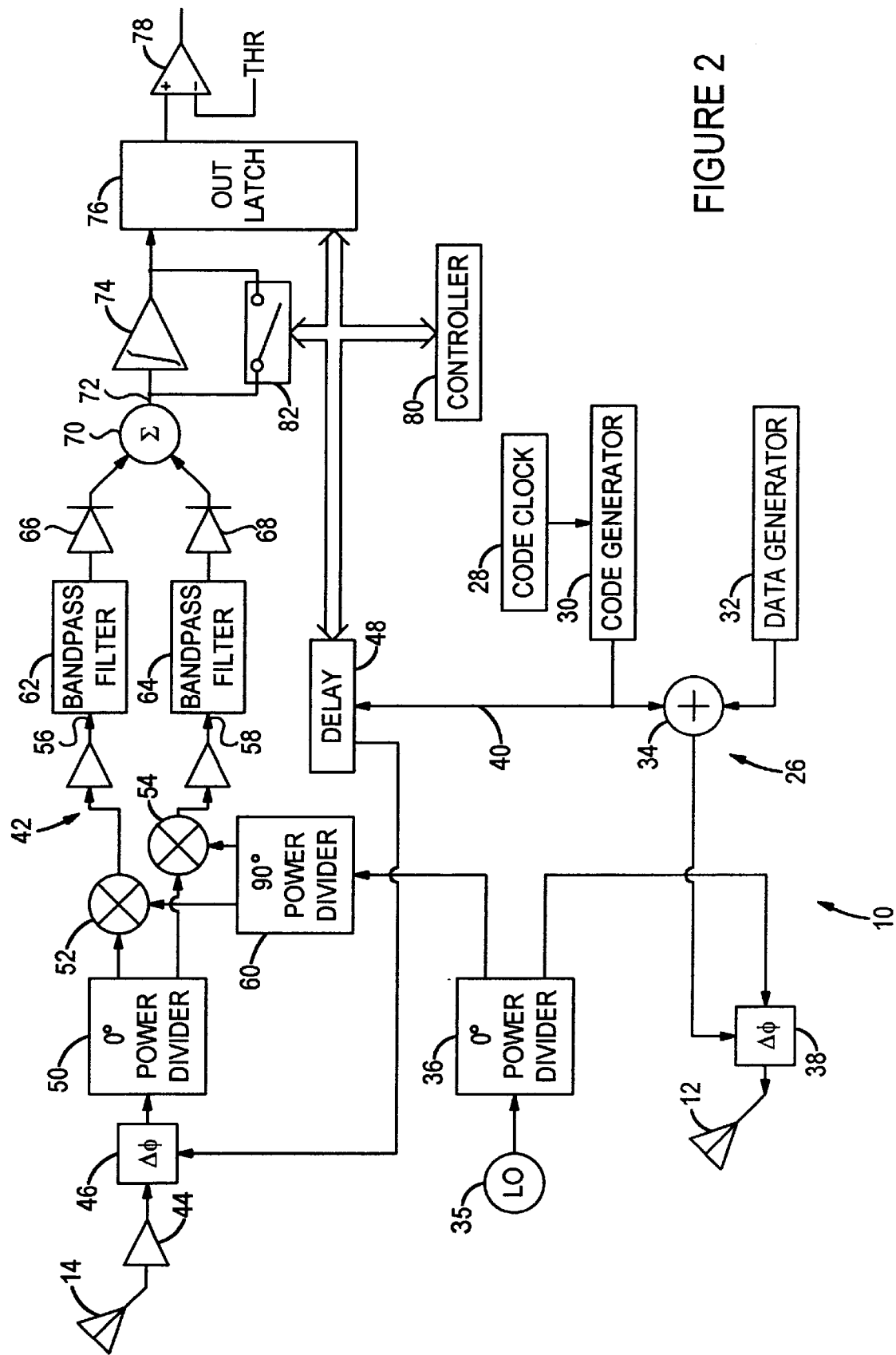
FIG. 2 is a block diagram of a the radar system of FIG. 1, including a microprocessor- based controller.

FIG. 2 is a block diagram of a system 10 in which a single range bin is scanned in range to cover the desired detection region. The transmitter antenna 12, depicted in FIG. 1, is coupled to a transmitter circuit 26 including a code clock 28, a code generator 30, a data generator 32, an Exclusive-OR gate 34, a Local Oscillator (LO) 35, a 0° Power Divider 36 and a controlled phase modulator circuit ($\Delta\emptyset$) 38. Briefly, code generator 30, under control of code clock 28, generates a maximal length pseudo-noise code on line, which is mixed with the output of data generator 32 by Exclusive-OR gate 34. The output of Local Oscillator 35, split by Power Divider 36, is applied as an input to phase modulator 38, which modulates the oscillator signal in accordance with the output of Exclusive-OR gate 34. The receiver antenna 14, depicted in FIG. 1, is coupled to a receiver circuit 42 that demodulates and integrates the detected signal corresponding to a selected range bin to determine the presence of any objects therein. The signal received by antenna 14 is initially coupled to a low noise amplifier (LNA) 44, and then applied as an input to the controlled phase modulator ($\Delta\emptyset$) 46, which modulates the received signal with the output of code generator 30, as variably delayed by delay line 48. The delay imposed by delay line 48 corresponds to the time of flight delay associated with an object to be detected in a selected range bin, and if the received signal matches that time delay, the output of phase modulator 46 will contain the data stream of data generator 32, modulated on a carrier wave at the frequency of the Local Oscillator 35. The output of phase modulator 46 is then split by Power Divider 50, and applied to the I and Q demodulators 52 and 54, which reproduce the data on lines 56 and 58, through the operation of Power Divider 60, which splits and 90° phase shifts the output of Local Oscillator 35. The data signals on lines 56, 58 are then filtered by band-pass filters 62, 64 to extract the fundamental frequency of the data stream, envelope detected by diodes 66, 68, and then summed at summing junction 70 to form a DC signal on line 72 corresponding to the amplitude of radar illumination reflected from one or more objects in the selected range bin. The signal on line 72 is then integrated by integrator 74, captured in Output Latch 76, and compared to a threshold level (THR) by comparator 78. When the latched signal exceeds the threshold THR, the comparator 78 indicates the presence of an object in the selected range bin.

Figure 3:
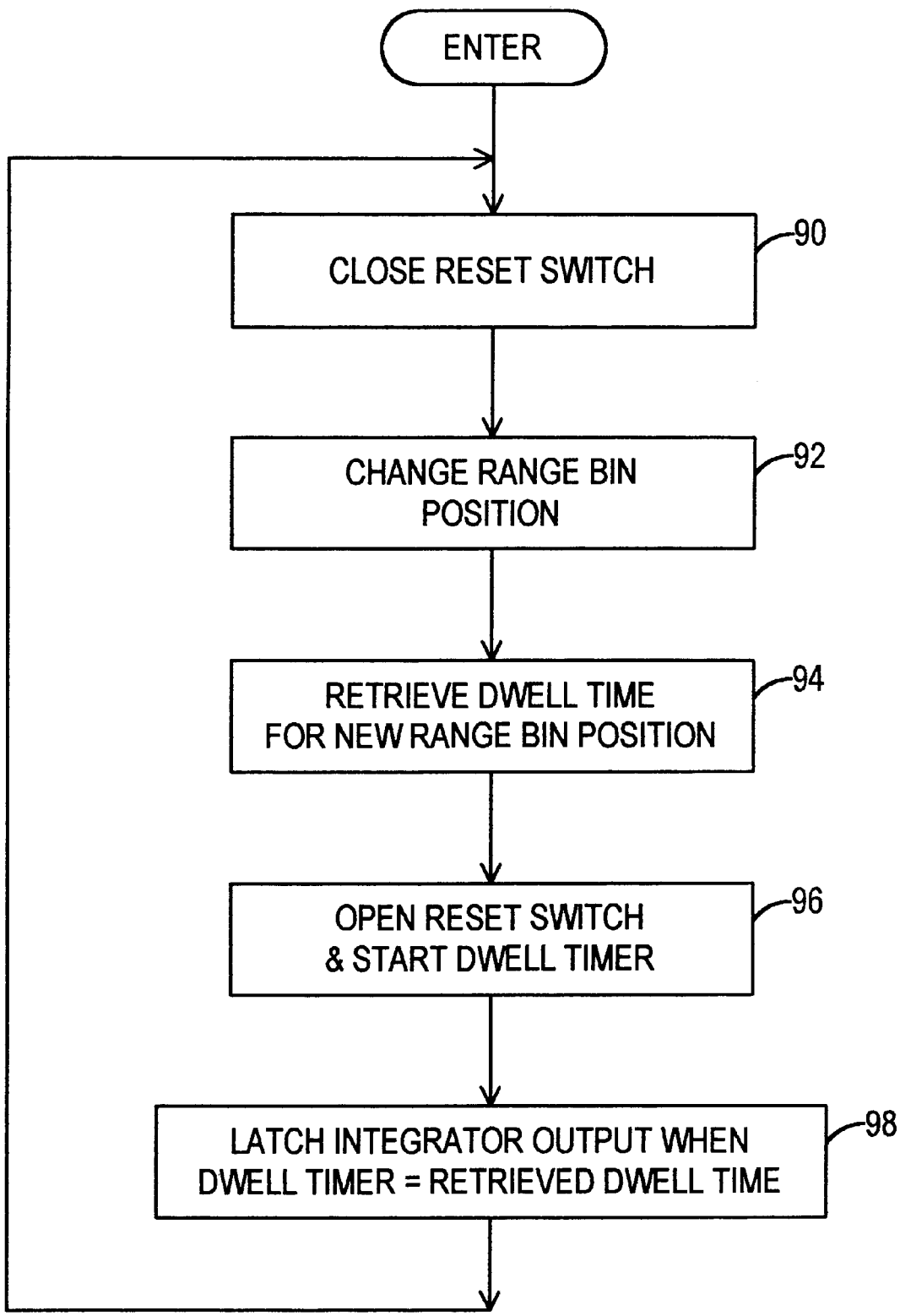
FIG. 3 is a portion of a flow diagram representing computer program instructions executed by the controller of FIG. 2 according to this invention.

In addition to the above-described elements, the radar electronics 16 includes a controller 80 coupled to the delay line 48, a reset switch 82 of integrator 74, and the output latch 76. The controller is micro-processor based, and operates as described in the flow diagram of FIG. 3 to control the operation of such elements so that the various range bins are scanned in succession to detect the presence and range of one or more objects in the desired detection region. As indicated in FIG. 3, the controller 80 successively and repeatedly performs the steps or operations identified by the blocks 90–98. At block 90, the controller 80 closes the reset switch 82 to reset and hold the integrator output to zero. Then while the switch 82 is closed, the blocks 92 and 94 are executed to change the range bin position by adjusting the code signal delay of delay line 48, and to retrieve a previously stored dwell time corresponding to the new range bin. Then the block 96 is executed to open the reset switch 82 to permit integrator 74 to integrate the signal on line 72, and to start a dwell timer. When the dwell timer reaches the dwell time retrieved at block 94, as determined at block 98, the output of integrator 74 is latched into Output Latch 76 for comparison with the threshold THR as described above in reference to FIG. 2. Then the blocks 90–94 are re-executed to close the reset switch 82 and index the range bin as described above. The process is repeated so long as the back up aid is activated—in the case of a vehicle, so long as the reverse transmission range of the vehicle is selected.

As described above, the key to the above process according to this invention is that the integration dwell time is varied depending on the selected range bin. In a practical mechanization of this invention, for example, the dwell times were selected as follows:

| Dwell times vs. Range Bin | | |
|---|---|---|
| Range bin position (meters from car) | Range bin number | Dwell time |
| 0–0.2 | 1 | 400 usec |
| 0.2–0.4 | 2 | 600 usec |
| 0.4–0.6 | 3 | 800 usec |
| 0.6–1.0 | 4–5 | 1200 usec |
| 1.0–1.4 | 6–7 | 2400 usec |
| 1.4–2.0 | 8–10 | 3600 usec |
| 2.0–5.0 | 11–25 | 5000 usec |

In contrast, the dwell time in a conventional radar system is the same for each range bin. By reducing the dwell time for range bins in closer proximity to the vehicle, the benefits described in reference to FIG. 1 are achieved without adding complex or costly circuitry to the radar electronics 16. Moreover, reducing the dwell times for one or more range bins permits the controller 80 to scan the range bins more quickly, thereby reducing the response time of the system, enabling quicker detection of an object entering the desired detection range. Moreover, reducing the dwell time for the range bins in proximity to the vehicle increases the effective dynamic range of the system by reducing the magnitude of the integrator output signal for such range bins.

While described in reference to the illustrated embodiments, it is expected that various modifications will occur to those skilled in the art. In this regard, it will be understood that the scope of this invention is not limited to the illustrated embodiments and that systems and methods incorporating such modifications may fall within the scope of this invention, which is defined by the appended claims.

We claim:

1. A method of operation for a radar system installed in a vehicle, where the radar system detects objects within a desired detection range of the vehicle, the detection range being divided into a plurality of contiguous detection regions of increasing distance from the vehicle, the method comprising the steps of:

illuminating the desired detection range with radar energy;

detecting radar energy reflected back to the system by objects disposed within the desired detection range;

for each of the detection regions in sequence, detecting and integrating the reflected energy corresponding to the respective detection region for a dwell interval selected for the respective detection region; and selecting the predetermined dwell intervals to increase in duration with the distance of the respective detection region from the vehicle.

2. The method of operation according to claim 1, wherein the radar system includes an integrator and the step of detecting and integrating the reflected energy corresponding to a respective detection region comprises the steps of:

retrieving a stored dwell time for the respective detection region;

detecting radar energy reflected back to the system from an object within the respective detection region;

resetting the integrator and integrating the detected energy for a timed interval; and latching an output of the integrator when the timed interval equals the retrieved dwell time.

3. The method of operation set forth in claim 2, including the step of:

indicating the presence of an object in the respective detection region when the latched output of the integrator exceeds a threshold value.

4. A method of operation for a radar system installed in a vehicle, where the radar system detects objects within a desired detection range of the vehicle, the radar system having a primary detection pattern that substantially coincides with the desired detection range and a secondary detection pattern that extends laterally outside of the desired detection range in an area proximate to the vehicle, the method comprising the steps of:

illuminating the desired detection range with radar energy;

dividing the desired detection range into a plurality of contiguous detection regions of increasing distance from the vehicle, and for each of the detection regions in sequence, detecting radar energy reflected back to the system, and integrating the detected energy for a dwell interval selected for the respective detection region; and selecting the predetermined dwell intervals to decrease as the distance between the detection region and vehicle decreases so as to reduce sensitivity of the radar system to energy reflected from objects within the secondary detection pattern but laterally outside the desired detection range.

5. The method of operation according to claim 4, wherein the radar system includes an integrator and the step of detecting radar energy reflected back to the system and integrating the detected energy for a dwell interval selected for the respective detection region comprises the steps of:

retrieving a stored dwell time for the respective detection region;

detecting radar energy reflected back to the system from an object within the respective detection region;

resetting the integrator and integrating the detected energy for a timed interval; and latching an output of the integrator when the timed interval equals the retrieved dwell time.

6. The method of operation set forth in claim 5, including the step of:

indicating the presence of an object in the respective detection region when the latched output of the integrator exceeds a threshold value.

7. A radar system installed in a vehicle, where the radar system detects objects within a desired detection range of the vehicle, the detection range being divided into a plurality of contiguous detection regions of increasing distance from the vehicle, comprising:

transmitter circuit for illuminating the desired detection range with radar energy;

receiver circuit for detecting radar energy reflected back to the system by objects disposed within the desired detection range;

an integrator responsive to the detected radar energy; and a controller for controlling the receiver circuit and the integrator such that for each of the detection regions in sequence, the receiver circuit is controlled to detect radar energy reflected from objects within the respective detection region, and the integrator is reset, and then controlled to integrate the detected radar energy for a dwell interval specific to the respective detection region, where the dwell interval decreases as the distance between the respective detection region and vehicle decreases.

8. The radar system set forth in claim 7, further comprising:

a latch controlled by the controller to latch an output of the integrator upon expiration of the respective dwell interval, and a comparator for comparing the latched integrator output to a threshold value to detect the presence of an object within the respective detection region.

* * * * *